United States Patent
Suzuki et al.

(10) Patent No.: US 10,856,192 B2
(45) Date of Patent: Dec. 1, 2020

(54) TERMINAL APPARATUS, BASE STATION APPARATUS, AND COMMUNICATION METHOD

(71) Applicant: Sharp Kabushiki Kaisha, Sakai (JP)

(72) Inventors: Shoichi Suzuki, Sakai (JP); Tatsushi Aiba, Sakai (JP); Wataru Ouchi, Sakai (JP); Takashi Hayashi, Sakai (JP); Tomoki Yoshimura, Sakai (JP); Liqing Liu, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 16/082,973

(22) PCT Filed: Feb. 28, 2017

(86) PCT No.: PCT/JP2017/007850
§ 371 (c)(1),
(2) Date: Sep. 7, 2018

(87) PCT Pub. No.: WO2017/159352
PCT Pub. Date: Sep. 21, 2017

(65) Prior Publication Data
US 2019/0124565 A1 Apr. 25, 2019

(30) Foreign Application Priority Data

Mar. 17, 2016 (JP) ................................. 2016-053474

(51) Int. Cl.
*H04W 36/00* (2009.01)
*H04L 5/00* (2006.01)
(Continued)

(52) U.S. Cl.
CPC ........... *H04W 36/0072* (2013.01); *H04L 1/00* (2013.01); *H04L 5/0044* (2013.01);
(Continued)

(58) Field of Classification Search
CPC ............ H04W 36/072; H04W 72/072; H04W 76/27; H04W 72/044; H04W 36/0055;
(Continued)

(56) References Cited

U.S. PATENT DOCUMENTS

2011/0199985 A1* 8/2011 Cai ........................ H04L 5/0073
370/329
2011/0235586 A1* 9/2011 Han ..................... H04B 7/0426
370/328
(Continued)

FOREIGN PATENT DOCUMENTS

CN 104105148 A 10/2014
EP 2 448 329 A1 5/2012
(Continued)

OTHER PUBLICATIONS

Official Communication issued in International Patent Application No. PCT/JP2017/007850, dated Mar. 28, 2017.
(Continued)

*Primary Examiner* — Christopher M Crutchfield
(74) *Attorney, Agent, or Firm* — Keating & Bennett, LLP

(57) ABSTRACT

A terminal apparatus 1 and a base station apparatus 3 efficiently continue to communicate with each other. The terminal apparatus 1 is a terminal apparatus to be handed over from a source cell to a target cell, and the terminal apparatus is handed over from the source cell to the target cell, and includes a receiver 13 configured to receive a higher layer information mobilityControlInfo including a first uplink grant and a subframe allocation information and a transmitter 13 configured to perform a transmission based on the first uplink grant in one of a plurality of subframes indicated by the subframe allocation information, wherein the subframe allocation information indicates at least one of
(Continued)

| CASE | HARQ FEEDBACK | PDCCH | OPERATION OF TERMINAL APPARATUS 1 | $r_{idx}$ |
|---|---|---|---|---|
| 1200 | ACK or NACK or None | PDCCH INCLUDING DCI FORMAT 0 | RETRANSMISSION ACCORDING TO PDCCH | $r_{idx}$ IS INDICATED BY PDCCH INCLUDING DCI FORMAT 0 |
| 1201 | ACK | None | NO RETRANSMISSION | - |
| 1202 | NACK | None | RETRANSMISSION ACCORDING TO NACK | INCREMENTAL REDUNDANCY |
| 1203 | None | None | RETRANSMISSION IN STEP 405 OF FIG. 4 | FIXED VALUE (E.G. 0) OR GIVEN BY SUBFRAME NUMBER IN RADIO FRAME | the plurality of subframes associated with a set having the same number across radio frames.

4 Claims, 16 Drawing Sheets

(51) Int. Cl.
    *H04L 1/00*     (2006.01)
    *H04W 36/08*     (2009.01)
    *H04W 36/38*     (2009.01)
    *H04W 24/10*     (2009.01)
    *H04W 72/14*     (2009.01)

(52) U.S. Cl.
    CPC ........... *H04L 5/0053* (2013.01); *H04W 36/08* (2013.01); *H04W 36/38* (2013.01); *H04L 5/0055* (2013.01); *H04W 24/10* (2013.01); *H04W 72/14* (2013.01)

(58) Field of Classification Search
    CPC ... H04W 36/0072; H04L 6/001; H04L 5/0053
    See application file for complete search history.

(56) References Cited

U.S. PATENT DOCUMENTS

| | | | |
|---|---|---|---|
| 2014/0233470 | A1 | 8/2014 | Kim et al. |
| 2014/0341125 | A1* | 11/2014 | Dayal ............... H04B 1/44 370/329 |
| 2015/0105084 | A1* | 4/2015 | Bontu ............ H04W 36/0072 455/437 |
| 2016/0088531 | A1* | 3/2016 | Rashid ............ H04W 36/0072 455/436 |
| 2017/0171787 | A1 | 6/2017 | Fu et al. |
| 2018/0213457 | A1* | 7/2018 | Tang ............... H04W 36/0083 |
| 2018/0375621 | A1* | 12/2018 | Turtinen ............... H04L 1/189 |

FOREIGN PATENT DOCUMENTS

| | | |
|---|---|---|
| JP | 2012-531141 A | 12/2012 |
| WO | 2015/122701 A1 | 8/2015 |

OTHER PUBLICATIONS

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, pp. 1-142.

"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0, Dec. 2015, pp. 1-121.

"3rd Generation Partnership Project; Technical Specification Group Radio Access Network; Evolved Universal Terrestrial Radio Access (E-UTRA); Physical layer procedures (Release 13)", 3GPP TS 36.213 V13.0.0, Dec. 2015, pp. 1-326.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0, Dec. 2015, pp. 1-82.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.0.0, Dec. 2015, pp. 1-507.

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.0, Nov. 2015, pp. 1-86.

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881 V0.5.2, Feb. 2016, pp. 1-92.

* cited by examiner

(500) DCI format 0:

o (501) 'Resource block assignment and hopping resource allocation' FIELD o (502) 'Modulation and coding scheme and redundancy version' FIELD o (503) 'New data indicator' FIELD o (504) 'CSI request' FIELD

(510) HOC grant:

o (511) 'Resource block assignment and hopping resource allocation' FIELD o (512) 'Modulation and coding scheme and redundancy version' FIELD o (513) 'CSI request' FIELD

FIG. 5

$$\text{Set } k_0 = R_{subblock} \cdot \left(2 \cdot \left\lceil \frac{N_{cb}}{8 R_{subblock}} \right\rceil \cdot rv_{idx} + 2\right)$$

Set $k = 0$ and $j = 0$ while $\{ k < E \}$ if $w_{(k_0+j) \bmod N_{cb}} \neq\, <NULL>$ $e_k = w_{(k_0+j) \bmod N_{cb}}$ $k = k + 1$ end if $j = j + 1$ end while

FIG. 9

| MCS Index $I_{MCS}$ | $Q'_m$ | TBS Index $I_{TBS}$ | Redundancy Version $rv_{idx}$ |
|---|---|---|---|
| 0 | 2 (QPSK) | 0 | 0 |
| 1 | 2 (QPSK) | 1 | 0 |
| 2 | 2 (QPSK) | 2 | 0 |
| 3 | 2 (QPSK) | 3 | 0 |
| 4 | 2 (QPSK) | 4 | 0 |
| 5 | 2 (QPSK) | 5 | 0 |
| 6 | 2 (QPSK) | 6 | 0 |
| 7 | 2 (QPSK) | 7 | 0 |
| 8 | 2 (QPSK) | 8 | 0 |
| 9 | 2 (QPSK) | 9 | 0 |
| 10 | 2 (QPSK) | 10 | 0 |
| 11 | 4 (16QAM) | 10 | 0 |
| 12 | 4 (16QAM) | 11 | 0 |
| 13 | 4 (16QAM) | 12 | 0 |
| 14 | 4 (16QAM) | 13 | 0 |
| 15 | 4 (16QAM) | 14 | 0 |
| 16 | 4 (16QAM) | 15 | 0 |
| 17 | 4 (16QAM) | 16 | 0 |
| 18 | 4 (16QAM) | 17 | 0 |
| 19 | 4 (16QAM) | 18 | 0 |
| 20 | 4 (16QAM) | 19 | 0 |
| 21 | 6 (64QAM) | 19 | 0 |
| 22 | 6 (64QAM) | 20 | 0 |
| 23 | 6 (64QAM) | 21 | 0 |
| 24 | 6 (64QAM) | 22 | 0 |
| 25 | 6 (64QAM) | 23 | 0 |
| 26 | 6 (64QAM) | 24 | 0 |
| 27 | 6 (64QAM) | 25 | 0 |
| 28 | 6 (64QAM) | 26 | 0 |
| 29 | | reserved | 1 |
| 30 | | | 2 |
| 31 | | | 3 |

FIG. 10

| MCS Index $I_{MCS}$ | $Q'_m$ | TBS Index $I_{TBS}$ | Redundancy Version $rv_{idx}$ |
|---|---|---|---|
| 0 | 2 (QPSK) | 0 | 0 |
| 1 | 2 (QPSK) | 1 | 0 |
| 2 | 2 (QPSK) | 2 | 0 |
| 3 | 2 (QPSK) | 3 | 0 |
| 4 | 2 (QPSK) | 4 | 0 |
| 5 | 2 (QPSK) | 5 | 0 |
| 6 | 2 (QPSK) | 6 | 0 |
| 7 | 2 (QPSK) | 7 | 0 |
| 8 | 2 (QPSK) | 8 | 0 |
| 9 | 2 (QPSK) | 9 | 0 |
| 10 | 2 (QPSK) | 10 | 0 |
| 11 | 4 (16QAM) | 10 | 0 |
| 12 | 4 (16QAM) | 11 | 0 |
| 13 | 4 (16QAM) | 12 | 0 |
| 14 | 4 (16QAM) | 13 | 0 |
| 15 | 4 (16QAM) | 14 | 0 |
| 16 | 4 (16QAM) | 15 | 0 |

FIG. 11

| CASE | HARQ FEEDBACK | PDCCH | OPERATION OF TERMINAL APPARATUS 1 | $rv_{idx}$ |
|---|---|---|---|---|
| 1200 | ACK or NACK or None | PDCCH INCLUDING DCI FORMAT 0 | RETRANSMISSION ACCORDING TO PDCCH | $rv_{idx}$ IS INDICATED BY PDCCH INCLUDING DCI FORMAT 0 |
| 1201 | ACK | None | NO RETRANSMISSION | - |
| 1202 | NACK | None | RETRANSMISSION ACCORDING TO NACK | INCREMENTAL REDUNDANCY |
| 1203 | None | None | RETRANSMISSION IN STEP 405 OF FIG. 4 | FIXED VALUE (E.G. 0) OR GIVEN BY SUBFRAME NUMBER IN RADIO FRAME |

FIG. 12

| STATE VARIABLE CURRENT_IRV | $rv_{idx}$ |
|---|---|
| 0 | 0 |
| 1 | 2 |
| 2 | 3 |
| 3 | 1 |

FIG. 13

TERMINAL APPARATUS, BASE STATION APPARATUS, AND COMMUNICATION METHOD

TECHNICAL FIELD

One aspect of the present invention relates to a terminal apparatus, a base station apparatus, an integrated circuit, and a communication method.

BACKGROUND ART

In the 3rd Generation Partnership Project (3GPP), a radio access method and a radio network for cellular mobile communications (hereinafter, referred to as "Long Term Evolution (trade name: LTE)", or "Evolved Universal Terrestrial Radio Access (EUTRA)") have been studied (NPLs 1, 2, 3, 4, 5). In LTE, a base station apparatus is also referred to as an evolved NodeB (eNodeB), and a terminal apparatus is also referred to as a User Equipment (UE). LTE is a cellular communication system in which a plurality of areas each covered by the base station apparatus are deployed in a cellular structure. A single base station apparatus may manage multiple cells.

In order to reduce a handover delay, (i) causing a terminal apparatus to be handed over from the source cell to the target cell without performing a random access procedure, and (ii) allocating an uplink grant previously, by a handover command, for transmitting the handover command response (RRC Connection Reconfiguration Complete message), are being studied (NPL 6).

CITATION LIST

Non Patent Literature

NPL 1: "3GPP TS 36.211 V13.0.0 (2015-12)", 6 Jan., 2016.
NPL 2: "3GPP TS 36.212 V 13.0.0 (2015-12)", 6 Jan., 2016.
NPL 3: "3GPP TS 36.213 V13.0.0 (2015-12)", 6 Jan., 2016
NPL 4: "3GPP TS 36.321 V 13.0.0 (2015-12)", 14 Jan., 2016
NPL 5: "3GPP TS 36.331 V 13.0.0 (2015-12)", 7 Jan., 2016.
NPL 6: "3GPP TR 36.881 v 0.5.0 (2015-11)", R2-157181, 4 Dec. 2015.

SUMMARY OF INVENTION

Technical Problem

The present invention provides a terminal apparatus that continues to efficiently communicate with a base station apparatus, a base station apparatus that communicates with the terminal apparatus, a communication method used for the terminal apparatus, a communication method used for the base station apparatus, an integrated circuit mounted on the terminal apparatus, and an integrated circuit mounted on the base station apparatus.

Solution to Problem (1) According to some aspects of the present invention, the following measures are provided. A first aspect of the present invention is a terminal apparatus to be handed over from a source cell to a target cell that includes a receiver configured to receive a higher layer information mobilityControlInfo including a first uplink grant and a subframe allocation information and a transmitter configured to perform a transmission based on the first uplink grant in one of a plurality of subframes indicated by the subframe allocation information, wherein the subframe allocation information indicates at least one of the plurality of subframes associated with a set having the same number across radio frames.

(2) A second aspect of the present invention is a base station apparatus for communicating with a terminal apparatus to be handed over from a source cell to a target cell, the base station apparatus including a transmitter configured to transmit a higher layer information mobilityControlInfo including a first uplink grant and a subframe allocation information and a receiver configured to receive a transmission transmitted by the terminal apparatus based on the first uplink grant in one of a plurality of subframes indicated by the subframe allocation information, wherein the subframe allocation information indicates at least one of the plurality of subframes associated with a set having the same number across radio frames.

(3) A third aspect of the present invention is a communication method used in a terminal apparatus to be handed over from a source cell to a target cell, the method including receiving a higher layer information mobilityControlInfo including a first uplink grant and a subframe allocation information and performing a transmission based on the first uplink grant in one of a plurality of subframes indicated by the subframe allocation information, wherein the subframe allocation information indicates at least one of the plurality of subframes associated with a set having the same number across radio frames.

(4) A fourth aspect of the present invention is a communication method used in a base station apparatus for communicating with a terminal apparatus to be handed over from a source cell to a target cell, the method including transmitting a higher layer information mobilityControlInfo including a first uplink grant and a subframe allocation information, and receiving a transmission transmitted by the terminal apparatus based on the first uplink grant in one of a plurality of subframes indicated by the subframe allocation information, wherein the subframe allocation information indicates at least one of the plurality of subframes associated with a set having the same number across radio frames.

Advantageous Effects of Invention

The present invention allows a terminal apparatus and a base station apparatus to efficiently continue to communicate with each other.

BRIEF DESCRIPTION OF DRAWINGS

FIG. 5 is a diagram for describing a field included in an uplink grant according to the present embodiment.

FIG. 9 is a diagram illustrating an example of bit selection and pruning according to the present embodiment.

FIG. 10 is a diagram illustrating an example of a relationship among the MCS index $I_{MCS}$, the modulation scheme $Q'_m$, the transport block size (TBS) index $I_{TBS}$, and the redundancy version $rv_{idx}$, which is indicated by a 5-bit modulation and coding scheme and redundancy version field according to the present embodiment.

FIG. 11 is a diagram illustrating an example of a relationship among the MCS index $I_{MCS}$, the modulation scheme Q'm, the transport block size (TBS) index $I_{TBS}$, and the redundancy version rvmx, which is indicated by a 4-bit modulation and coding scheme and redundancy version field according to the present embodiment.

FIG. 12 is a diagram illustrating an example of a case of retransmission according to the present embodiment.

FIG. 13 is a diagram illustrating an example of a relationship between a state variable CURRENT_IRV and a redundancy version rvidx according to the present embodiment.

DESCRIPTION OF EMBODIMENTS

Embodiments of the present invention will be described below.

Figure 1:
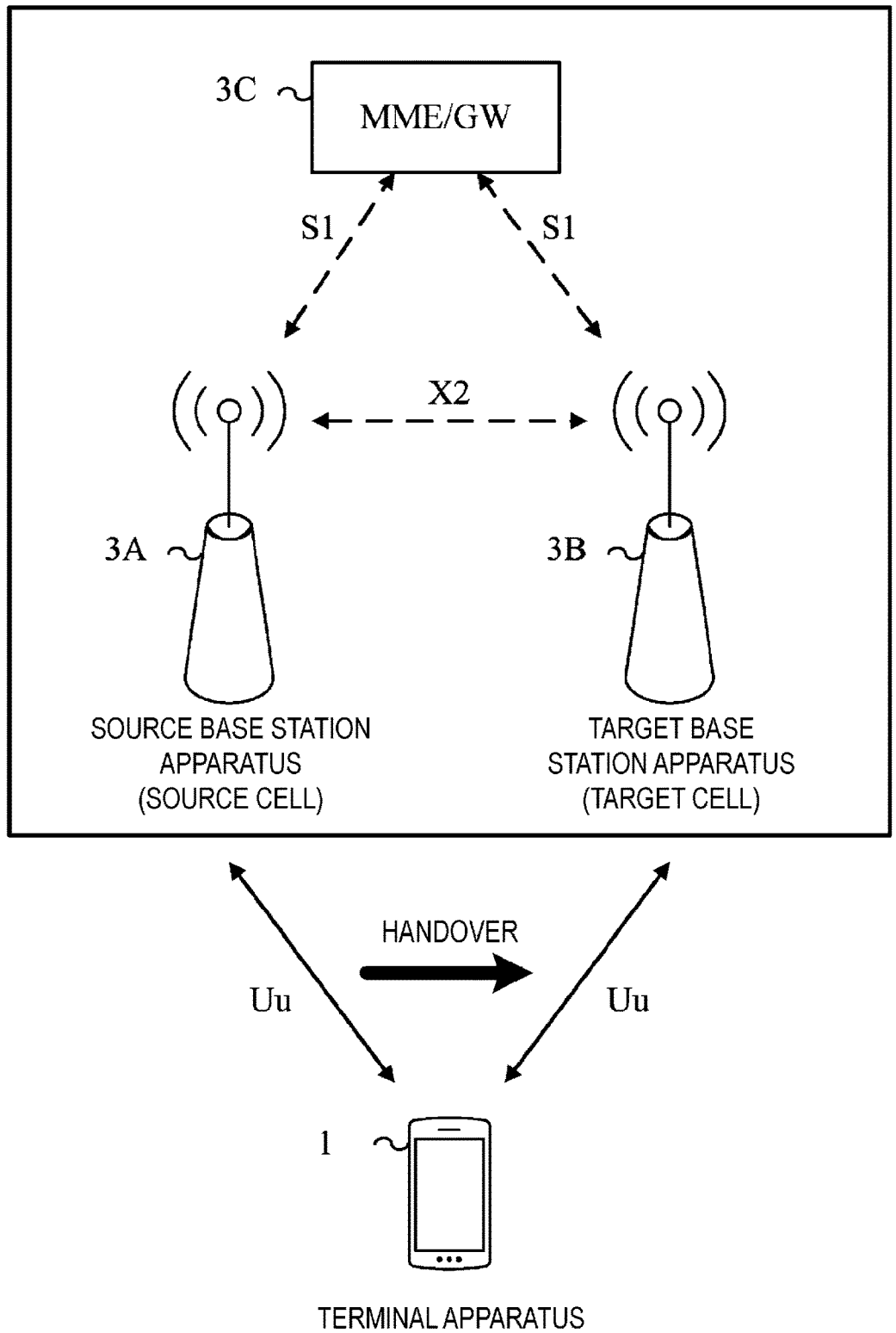
FIG. 1 is a conceptual diagram of a radio communication system according to the present embodiment.

FIG. 1 is a conceptual diagram of a radio communication system according to the present embodiment. In FIG. 1, the radio communication system includes a terminal apparatus 1 and a base station apparatus 3. The base station apparatus 3 includes a source base station apparatus 3A, a target base station apparatus 3B, and a mobility management entity (MME)/gateway (GW). Uu is a radio access link between the terminal apparatus 1 and the base station apparatus 3. Uu includes an uplink from the terminal apparatus 1 to the base station apparatus 3 and a downlink from the base station apparatus 3 to the terminal apparatus 1. X2 is a backhaul link between the source base station apparatus 3A and the target base station apparatus 3B. S1 is a backhaul link between the source base station apparatus 3A/the target base station apparatus 3B and the MME/GW.

The terminal apparatus 1 may be handed over from the source base station apparatus 3A to the target base station apparatus 3B. The terminal apparatus 1 may be handed over from the source cell to the target cell. The source cell may be managed by the source base station apparatus 3A. The target cell may be managed by the target base station apparatus 3B. The source base station apparatus 3A and the target base station apparatus 3B may be the same apparatus. Namely, the terminal apparatus 1 may be handed over from the source cell managed by the source base station apparatus 3A to the target cell managed by the source base station apparatus 3A. The source cell is also referred to as a source primary cell. The target cell is also referred to as a target primary cell.

Now, carrier aggregation will be described.

In the present embodiment, multiple serving cells are configured for the terminal apparatus 1. A technology in which the terminal apparatus 1 performs communications via the multiple serving cells is referred to as cell aggregation or carrier aggregation. In carrier aggregation, the multiple serving cells configured are also referred to as aggregated serving cells.

Time Division Duplex (TDD) and/or Frequency Division Duplex (FDD) are applied to a radio communication system in the present embodiment. In cell aggregation, TDD may be applied to all multiple serving cells. Additionally, in cell aggregation, a serving cell to which TDD is applied and a serving cell to which FDD is applied may be aggregated. In the present embodiment, a serving cell to which TDD is applied is also referred to as a TDD serving cell.

The multiple serving cells configured include one primary cell and one or multiple secondary cells. The primary cell is a serving cell in which an initial connection establishment procedure has been performed, a serving cell in which a connection re-establishment procedure has been started, or a cell indicated as a primary cell in a handover procedure. A secondary cell may be configured at the time or after a Radio Resource Control (RRC) connection is established.

The primary cell includes a source primary cell and a target primary cell.

A carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 can perform simultaneous transmission of multiple physical channels/multiple physical signals in the multiple serving cells (component careers) to be aggregated. The terminal apparatus 1 can perform simultaneous reception of multiple physical channels/multiple physical signals in the multiple serving cells (component careers) to be aggregated.

Figure 2:
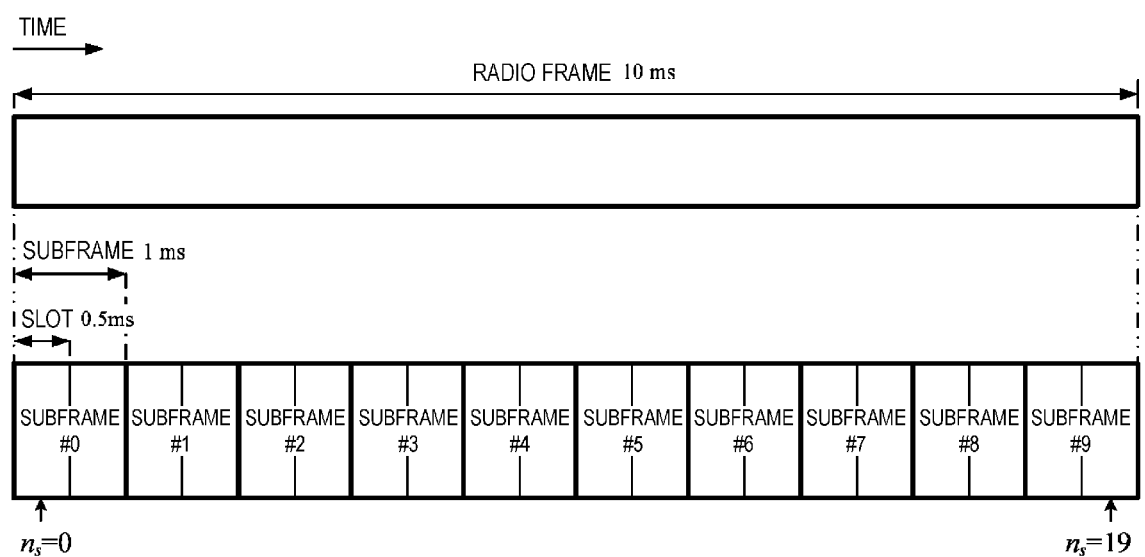
FIG. 2 is a diagram illustrating a schematic structure of a radio frame according to the present embodiment.

FIG. 2 is a diagram illustrating a schematic structure of a radio frame according to the present embodiment. In FIG. 2, the horizontal axis is a time axis.

The sizes of various fields in a time domain are expressed by the number of time units $T_s=1/(15000\times2048)$ seconds. The length of the radio frame is $T_f=307200\times T_s=10$ ms. Each of the radio frames includes ten contiguous subframes in the time domain. The length of each subframe is: $T_{subframe}=30720\times T_s=1$ ms. Each of the subframes i includes two contiguous slots in the time domain. The two contiguous slots in the time domain include a slot having a slot number $n_s$ of 2i in the radio frame and a slot having a slot number $n_s$ of 2i+1 in the radio frame. The length of each slot is: $T_{slot}=153600\times n_s=0.5$ ms. Each of the radio frames includes ten contiguous subframes in the time domain. Each of the radio frames includes 20 contiguous slots ($n_s=0, 1, \ldots, 19$) in the time domain.

Figure 3:
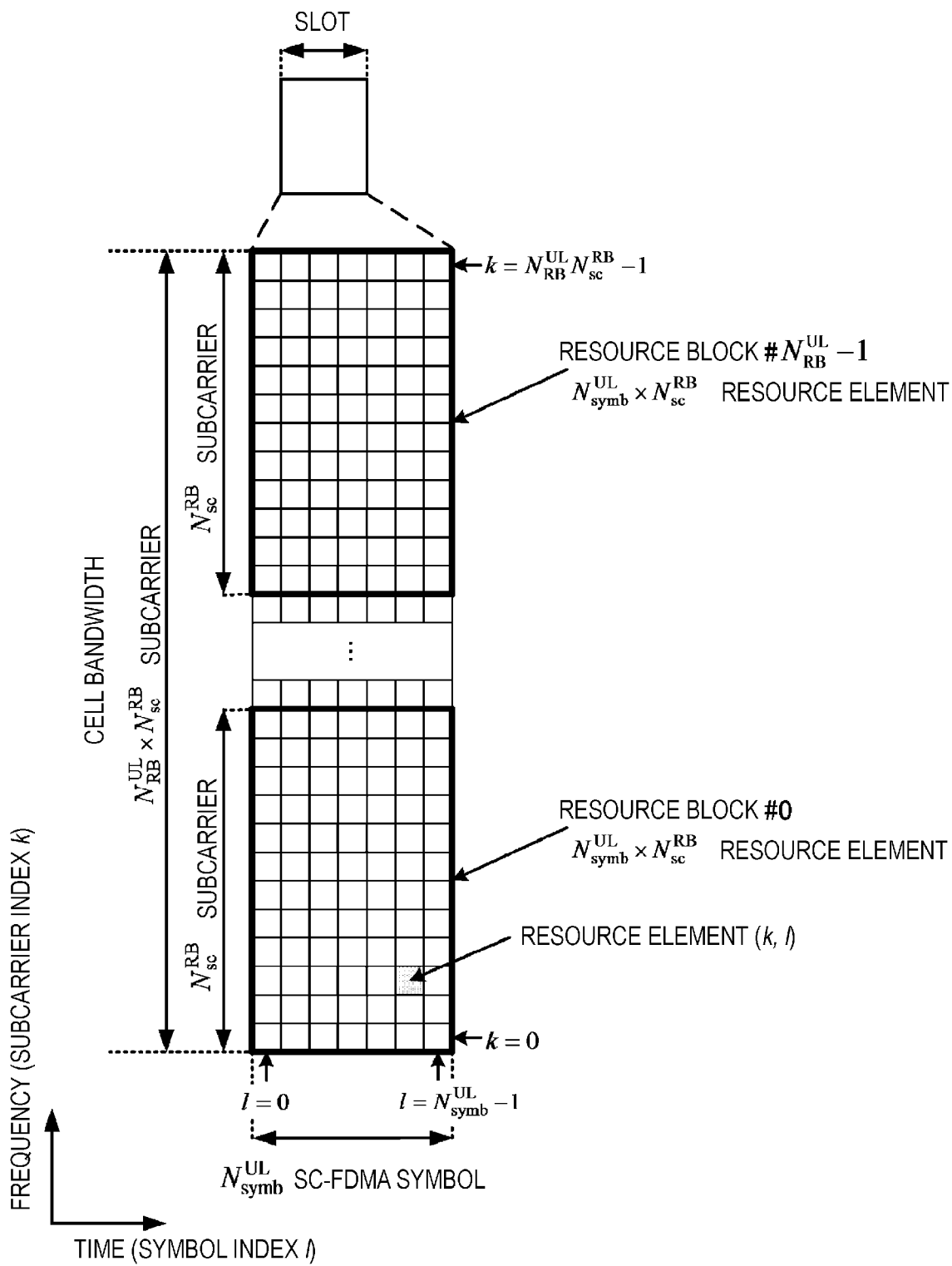
FIG. 3 is a diagram illustrating a schematic configuration of an uplink slot according to the present embodiment.

A configuration of a slot according to the present embodiment will be described below. FIG. 3 is a diagram illustrating a schematic configuration of an uplink slot according to the present embodiment. FIG. 3 illustrates a configuration of an uplink slot in one cell. In FIG. 3, the horizontal axis is a time axis, and the vertical axis is a frequency axis. In FIG.

3, 1 is a Single Carrier-Frequency Division Multiple Access (SC-FDMA) symbol number/index, and k is a subcarrier number/index.

The physical signal or the physical channel transmitted in each of the slots is expressed by a resource grid. In uplink, the resource grid is defined by a plurality of subcarriers and a plurality of SC-FDMA symbols. Each element within the resource grid is referred to as a resource element. The resource element is expressed by a subcarrier number/index k and an SC-FDMA symbol number/index 1.

The resource grid is defined for each antenna port. In the present embodiment, description is given for one antenna port. The present embodiment may be applied to each of multiple antenna ports.

The uplink slot includes a plurality of SC-FDMA symbols 1 (1=0, 1, . . . , and $N^{UL}_{symb}$) in the time domain. $N^{UL}_{symb}$ indicates the number of SC-FDMA symbols included in one uplink slot. For a normal Cyclic Prefix (CP), $N^{UL}_{symb}$ is 7. For an extended Cyclic Prefix (CP), $N^{UL}_{symb}$ is 6.

The uplink slot includes a plurality of subcarriers k (k=0, 1, . . . , $N^{UL}_{RB} \times N^{RB}_{sc}$) in a frequency domain. $N^{UL}_{RB}$ is an uplink bandwidth configuration for a serving cell, which is expressed by a multiple of $N^{RB}_{sc}$. $N^{RB}_{sc}$ is a (physical) resource block size in the frequency domain, which is expressed by the number of subcarriers. In the present embodiment, a subcarrier interval Δf is 15 kHz, and $N^{RB}_{sc}$ is 12 subcarriers. Namely, in the present embodiment, $N^{RB}_{sc}$ is 180 kHz.

A resource block is used to express mapping of a physical channel to resource elements. For the resource blocks, a virtual resource block and a physical resource block are defined. The physical channel is first mapped to the virtual resource block. Thereafter, the virtual resource block is mapped to the physical resource block. One physical resource block is defined by $N^{UL}_{symb}$ contiguous SC-FDMA symbols in the time domain and by $N^{RB}_{sc}$ contiguous subcarriers in the frequency domain. Hence, one physical resource block is configured by ($N^{UL}_{symb} \times N^{RB}_{sc}$) resource elements. One physical resource block corresponds to one slot in the time domain. The physical resource blocks are numbered/indexed (0, 1, . . . , $N^{UL}_{RB}-1$) in an order starting from a lower frequency in the frequency domain.

The downlink slot in the present embodiment includes a plurality of OFDM symbols. Since the configuration of the downlink slot in the present embodiment is the same as the configuration of the uplink slot except that the resource grid is defined by a plurality of subcarriers and a plurality of OFDM symbols, the description of the configuration of the downlink slot will be omitted.

Physical channels and physical signals in the present embodiment will be described.

In FIG. 1, the following uplink physical channels are used for uplink radio communication from the terminal apparatus 1 to the base station apparatus 3. The uplink physical channels are used by a physical layer for transmission of information output from a higher layer.

Physical Uplink Control Channel (PUCCH)
Physical Uplink Shared Channel (PUSCH)
Physical Random Access Channel (PRACH)

The PUCCH is used for transmission of Uplink Control Information (UCI). The uplink control information includes: downlink Channel State Information (CSI); a Scheduling Request (SR) used to request a PUSCH (Uplink-Shared Channel: UL-SCH) resource for initial transmission; and a Hybrid Automatic Repeat request ACKnowledgement (HARQ-ACK) for the downlink data (a Transport block, a Medium Access Control Protocol Data Unit (MAC PDU), a Downlink-Shared Channel (DL-SCH), and a Physical Downlink Shared Channel (PDSCH)). The HARQ-ACK indicates an acknowledgement (ACK) or a negative-acknowledgement (NACK). The HARQ-ACK is also referred to as HARQ feedback, HARQ information, HARQ control information, and ACK/NACK.

The PUSCH is used for transmission of uplink data (Uplink-Shared Channel (UL-SCH)). The PUSCH may also be used to transmit the HARQ-ACK and/or channel state information along with the uplink data. Furthermore, the PUSCH may be used to transmit only the channel state information or to transmit only the HARQ-ACK and the channel state information. PUSCH is used to transmit a random access message 3.

The PRACH is used for transmission of a random access preamble (random access message 1). The PRACH is used for indicating the initial connection establishment procedure, the handover procedure, the connection re-establishment procedure, synchronization (timing adjustment) for uplink transmission, and the request for the PUSCH (UL-SCH) resource.

In FIG. 1, the following uplink physical signal is used in the uplink radio communication. The uplink physical signal is not used for transmission of information output from the higher layer, but is used by the physical layer.

Uplink Reference Signal (UL RS)

In the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 may use the SRS for measuring the channel condition. The SRS is transmitted using the last SC-FDMA symbol within the uplink subframe, or using the SC-FDMA symbol within the UpPTS.

In FIG. 1, the following downlink physical channels are used for downlink radio communication from the base station apparatus 3 to the terminal apparatus 1. The downlink physical channels are used by the physical layer for transmission of information output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB, Broadcast Channel (BCH)), that is commonly used by the terminal apparatuses 1. The MIB is transmitted at intervals of 40 ms, and the MIB is repeatedly transmitted every 10 ms. Specifically, initial transmission of the MIB is performed in a subframe 0 in a radio frame that satisfies: SFN mod 4=0, and re-transmission (repetition) of the MIB is performed in subframes 0 in all the other radio frames. A system frame number (SFN) is a radio frame number. The MIB is system information. For example, the MIB includes information indicating the SFN.

The PCFICH is used for transmission of information indicating a region (OFDM symbols) to be used for transmission of the PDCCH.

The PHICH is used for transmission of the HARQ indicator for the uplink data (UpLink-Shared Channel (UL-SCH)) received by the base station apparatus 3. HARQ INDICATOR indicates HARC-ACK.

The PDCCH and the EPDCCH are used for transmission of Downlink Control Information (DCI). The Downlink Control Information is also referred to as a DCI format. The Downlink Control Information includes a downlink grant and an uplink grant. The downlink grant is also referred to as downlink assignment or downlink allocation.

One downlink grant is used for scheduling of one PDSCH within one serving cell. The downlink grant is used for scheduling of the PDSCH within a subframe that is the same as the subframe in which the downlink grant has been transmitted.

One uplink grant is used for scheduling of one PUSCH within one serving cell. The uplink grant is used for scheduling of the PUSCH within the fourth or later subframe from the subframe in which the uplink grant has been transmitted.

The uplink grant transmitted on the PDCCH includes the DCI format 0. A PUSCH transmission scheme corresponding to the DCI format 0 is single antenna port. The terminal apparatus 1 uses a single antenna port transmission scheme for PUSCH transmission corresponding to the DCI format 0. The PUSCH to which the single antenna port transmission scheme is applied is used for transmission of one codeword (one transport block).

The uplink grant to be transmitted on the PDCCH includes the DCI format 4. A PUSCH transmission scheme corresponding to the DCI format 4 is closed-loop spatial multiplexing. The terminal apparatus 1 uses a closed loop spatial multiplexing transmission scheme for PUSCH transmission corresponding to the DCI format 4. The PUSCH to which the closed-loop spatial multiplexing transmission scheme is applied is used for transmission of up to two codewords (up to two transport blocks).

CRC parity bits attached to the downlink grant or the uplink grant are scrambled with a Cell-Radio Network Temporary Identifier (C-RNTI), a Temporary C-RNTI, or a Semi Persistent Scheduling (SPS) Cell-Radio Network Temporary Identifier (C-RNTI). The C-RNTI and the SPS C-RNTI are identifiers for identifying a terminal apparatus within a cell. The Temporary C-RNTI is used during a contention based random access procedure.

The C-RNTI is used to control the PDSCH or the PUSCH in one subframe. The SPS C-RNTI is used to periodically allocate a resource for the PDSCH or the PUSCH. The Temporary C-RNTI is used to schedule the retransmission of the random access message 3 and the transmission of the random access message 4.

The PDSCH is used for transmission of downlink data (Downlink Shared Channel (DL-SCH)). The PDSCH is used for transmission of a random access message 2 (random access response). PDSCH is used for transmission of a handover command.

The random access response includes a Random Access Response (RAR) grant. The RAR grant is an uplink grant transmitted on the PDSCH. The terminal apparatus 1 uses a single antenna port transmission scheme for PUSCH transmission corresponding to the RAR grant and for the PUSCH retransmission for the same transport block.

The handover command may include a Handover Command (HOC) grant. The HOC grant is an uplink grant transmitted on the PDSCH. The terminal apparatus 1 may use a single antenna port transmission scheme for PUSCH transmission corresponding to the HOC grant and for the PUSCH retransmission for the same transport block. The retransmission of the transport block transmitted on the PUSCH corresponding to the HOC grant may be indicated by DCI format 0 and NACK.

The PMCH is used for transmission of Multicast Channel (MCH) data.

In FIG. 1, the following downlink physical signals are used in the downlink radio communication. The downlink physical signals are not used for transmission of information output from the higher layer, but are used by the physical layer.

Synchronization signal (SS)
Downlink Reference Signal (DL RS)

The Synchronization signal is used in order for the terminal apparatus 1 to have synchronization of a downlink in the frequency domain and the time domain. The synchronization signal includes Primary Synchronization Signal (PSS) and Second Synchronization Signal (SSS).

The Downlink Reference Signal is used in order for the terminal apparatus 1 to perform channel compensation on a downlink physical channel. The Downlink Reference Signal is used in order for the terminal apparatus 1 to calculate downlink channel state information.

In the present embodiment, the following seven types of Downlink Reference Signals are used.

Cell-specific Reference Signal (CRS)
UE-specific Reference Signal (URS) associated with the PDSCH
Demodulation Reference Signal (DMRS) associated with the EPDCCH
Non-Zero Power Chanel State Information-Reference Signal (NZP CSI-RS)
Zero Power Chanel State Information-Reference Signal (ZP CSI-RS)
Multimedia Broadcast and Multicast Service over Single Frequency Network Reference Signal (MBSFN RS)
Positioning Reference Signal (PRS)

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and coding processing is performed for each codeword.

The base station apparatus 3 and the terminal apparatus 1 exchange (transmit and/or receive) a signal in the higher layer. For example, the base station apparatus 3 and the terminal apparatus 1 may transmit and/or receive, in a Radio Resource Control (RRC) layer, RRC signaling (also referred to as a Radio Resource Control message (RRC message) or Radio Resource Control information (RRC information)). Furthermore, the base station apparatus 3 and the terminal apparatus 1 may transmit and/or receive, in the Medium Access Control (MAC) layer, a MAC Control Element (CE). Here, the RRC signaling and/or the MAC CE is also referred to as higher layer signaling.

The PUSCH and the PDSCH are used for transmission of the RRC signaling and the MAC CE. Here, the RRC signaling transmitted from the base station apparatus 3 on the PDSCH may be signaling common to multiple terminal apparatuses 1 in a cell. The RRC signaling transmitted from the base station apparatus 3 on the PDSCH may be signaling dedicated to a certain terminal apparatus 1 (also referred to as dedicated signaling or UE specific signaling). A cell-specific parameter may be transmitted by using the signaling common to the multiple terminal apparatuses 1 in the cell or the signaling dedicated to the certain terminal apparatus 1. A UE-specific parameter may be transmitted by using the signaling dedicated to the certain terminal apparatus 1.

Figure 4:
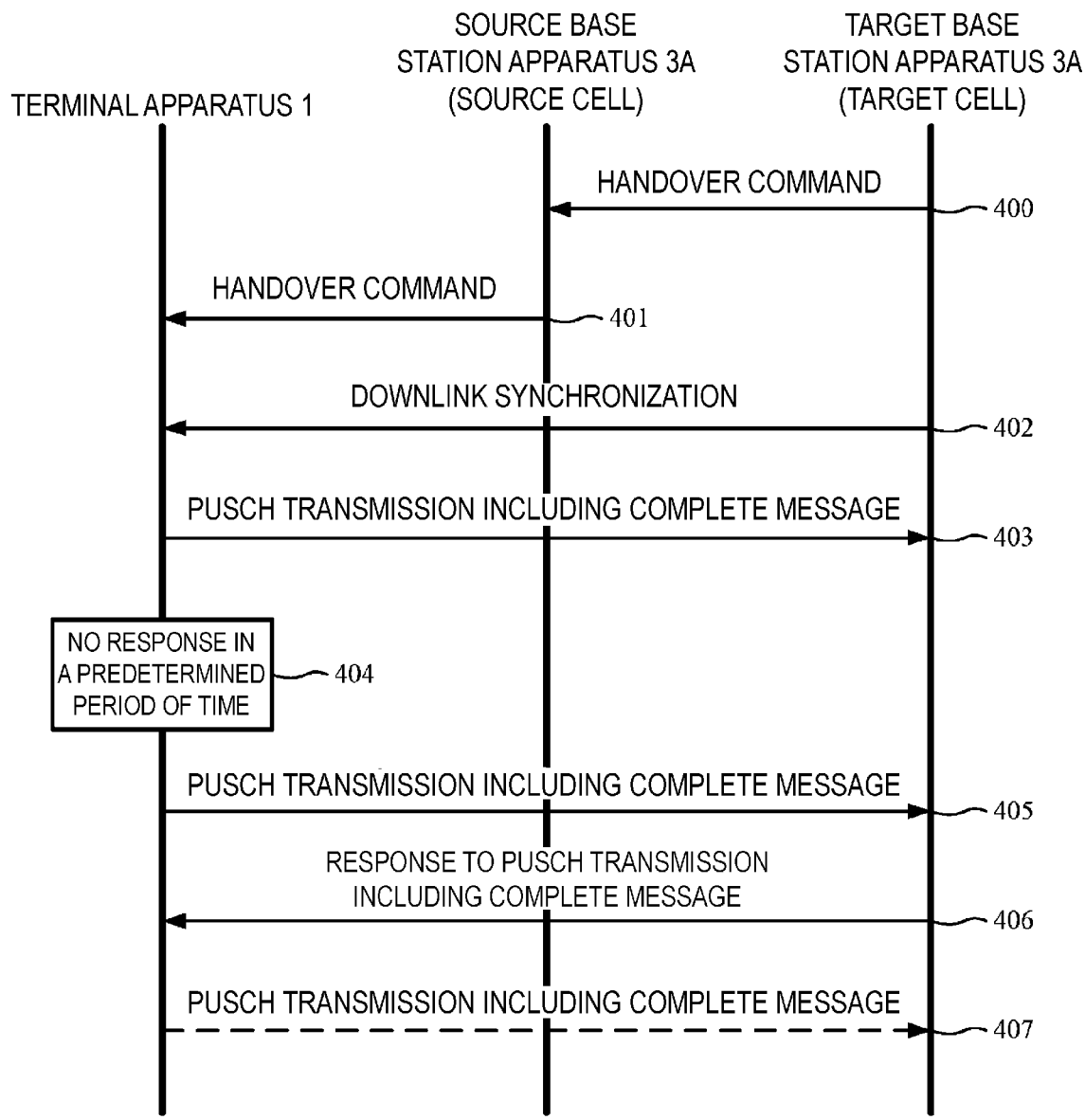
FIG. 4 is a diagram illustrating an example of a handover procedure according to the present embodiment.

FIG. 4 is a diagram illustrating an example of a handover procedure according to the present embodiment.

(Step 400) The target base station apparatus 3B transmits a handover command to the source base station apparatus 3A. The handover command is a parameter RRCConnectionReconfiguration including the parameter mobilityControlInfo. The parameter mobilityControlInfo may include an HOC grant, information for indicating C-RNTI in the target cell, information for indicating SPS C-RNTI in the target cell, and information on the target cell. The information on the target cell may include information for indicating PCI (Physical layer Cell Identity) of the target cell and information for indicating the frequency of the target cell.

(Step 401) Using the PDSCH, the source base station apparatus 3A transmits the handover command received from the source base station apparatus 3A to the terminal apparatus 1.

(Step 402) The terminal apparatus 1 obtains the downlink synchronization of the target cell based on the information on the target cell. In order to obtain the downlink synchronization, the terminal apparatus 1 may use some or all of the synchronization signal of the target cell, the CRS of the target cell, or the PBCH of the target cell.

(Step 403) The terminal apparatus 1 transmits the uplink data on the PUSCH based on the HOC grant in the target cell. The uplink data may include a complete message (RRCConnectionReconfigurationComplete message). The transmission timing of the PUSCH may be adjusted by the terminal apparatus 1.

(Step 404) The terminal apparatus 1 attempts to receive/decode a response to the PUSCH (uplink data) corresponding to the HOC grant for a predetermined period of time in the target cell.

The response may include some or all of the following.

Response type A: PHICH (HARQ indicator, ACK or NACK) for uplink data transmitted on PUSCH corresponding to HOC grant Response type B: PHICH (ACK only, NACK excluded) for uplink data transmitted on PUSCH corresponding to HOC grant Response type C: PDCCH/EPDCCH including the C-RNTI indicated by the handover command Response type D: PDCCH/EPDCCH including the SPS C-RNTI indicated by the handover command The predetermined period of time in step 404 may be different depending on the type of response. For example, the predetermined period of time for response type A and response type B may be subframe n+4. For example, the predetermined period of time for response type C and response type D may be subframe n+4 to subframe n+4+α. Here, the subframe n is a subframe in which the PUSCH corresponding to the HOC grant is transmitted. Here, the information for indicating the value of α may be included in the handover command.

(Step 405) In a case that there is no response in the predetermined period of time at step 404, the terminal apparatus 1 transmits (retransmits) the uplink data on the PUSCH based on the HOC grant. The uplink data may include a complete message (RRCConnectionReconfigurationComplete message). The uplink data transmitted in step 405 may be the same as the uplink data transmitted in step 403.

(Step 406) The terminal apparatus 1 detects a response to the PUSCH transmission in step 405. The terminal apparatus 1 may end the processing of the handover procedure based on the detection of the response. Based on the detection of the response, the terminal apparatus 1 may determines that the handover has been successful.

(Step 407) When detecting the NACK in step 406, the terminal apparatus 1 retransmits the uplink data on the PUSCH based on the HOC grant. A retransmission based on NACK is referred to as non-adaptive retransmission.

(Step 407) When detecting the PDCCH/EPDCCH including the DCI format 0 indicating retransmission in step 406, the terminal apparatus 1 retransmits the uplink data on the PUSCH based on the DCI format 0. A retransmission based on DCI format 0 is referred to as adaptive retransmission.

FIG. 5 is a diagram for describing a field included in an uplink grant according to the present embodiment.

The 'Resource block assignment and hopping resource allocation' field is used to indicate the physical resource block to which the PUSCH is allocated. The 'Resource block assignment and hopping resource allocation' field may be included in both DCI format 0 and HOC grant.

The 'Modulation and coding scheme and redundancy version' field is used to indicate the size of the transport block, the modulation scheme (modulation order $Q'_m$), and the redundancy version $rv_{idx}$. The 'Modulation and coding scheme and redundancy version' field may be included in both DCI format 0 and HOC grant.

The 'New data indicator' field is used to indicate initial transmission or retransmission of PUSCH (transport block). The 'New data indicator' field may be included in the DCI format 0. The 'New data indicator' field is not included in the HOC grant.

The 'CSI request' field is used to indicate the transmission of CSI to the cell. The 'CSI request' field may be included in both DCI format 0 and HOC grant. The 'CSI request' field has 1-bit length or 2-bit length. The 'CSI request' field is also referred to as CSI (Channel State Information) request.

In a case that more than one downlink cell (serving cell) is configured for the terminal apparatus 1 and the DCI format 0 is mapped to a USS (UE-specific Search Space) given by C-RNTI, 'CSI request' field included in the DCI format 0 has 2-bit length. In a case that one downlink cell (serving cell) is configured for the terminal apparatus 1, the 'CSI request' field included in the DCI format 0 may have 1-bit length. In a case that the DCI format 0 is mapped to a search space other than the USS given by the C-RNTI, the 'CSI request' field included in the DCI format 0 may have 1-bit length. The search space other than USS given by C-RNTI may include CSS (Common Search Space) and USS given by Temporary C-RNTI. Here, CSS and USS constitutes a set of resources for which PDCCH/EPDCCH is monitored.

The handover command may include information for indicating a secondary cell. Namely, the terminal apparatus 1 may add/remove the secondary cell based on information for indicating the secondary cell. Regardless of the number of downlink cells (primary cells/secondary cells after handover) allocated by the handover command, the 'CSI request' field included in the HOC grant may have 1-bit length. Namely, regardless of the number of downlink cells (serving cells) configured for the terminal apparatus 1, the 'CSI request' field included in the HOC grant may have 1-bit length.

In a case that the DCI format 0 for the serving cell is decoded in the subframe n and the 'CSI request' field of the DCI format 0 is set to trigger the aperiodic CSI report, the terminal apparatus 1 performs the aperiodic CSI report using PUSCH at the subframe n+k1 in the serving cell. Here, for the FDD serving cell, k1 is 4.

In a case that the 'CSI request' field included in the DCI format 0 for the serving cell has 1-bit length and is set to '1', the aperiodic CSI report may be triggered for the serving cell.

In a case that the 'CSI request' field included in the DCI format 0 for the serving cell has 2-bit length and is set to '01', the aperiodic CSI report may be triggered for the serving cell.

In a case that the 'CSI request' field included in the DCI format 0 for the serving cell has 2-bit length and is set to '10', the aperiodic CSI report may be triggered for the first set of serving cells. The aperiodic CSI report may include CSI for each serving cell belonging to the first set.

In a case that the 'CSI request' field included in the DCI format 0 for the serving cell has 2-bit length and is set to '11', the aperiodic CSI report may be triggered for the second set of serving cells. The aperiodic CSI report may include CSI for each serving cell belonging to the second set.

The first set of serving cells and the second set of serving cells are configured by upper layers. The terminal apparatus 1 may receive upper layer parameters indicating the first set of serving cells and the second set of serving cells from the base station apparatus 3.

In a case that the 'CSI request' field included in the HOC grant is set to '1', the aperiodic CSI report may be triggered for the target cell. In a case that the 'CSI request' field included in the HOC grant is set to '1', the terminal apparatus 1 performs an aperiodic CSI report on the target cell in the subframe m in the target cell using the PUSCH. The aperiodic CSI report may be performed in step 403 of FIG. 4 and step 405 of FIG. 4. In a case that the 'CSI request' field included in the HOC grant is set to '1', the PUSCH including the uplink data and the CSI may be transmitted based on the HOC grant in step 403 of FIG. 4. In a case that the 'CSI request' field included in the HOC grant is set to '1', and in step 405 of FIG. 4 there is no response to the PUSCH transmitted in step 403, the PUSCH including the uplink data and the CSI may be transmitted (retransmitted) based on the HOC grant. The CSI to be transmitted in step 403 and the CSI to be transmitted in step 405 may be different from each other. In each of step 403 and step 405, the latest CSI may be transmitted. The CSI transmitted in step 405 may have been recalculated. The uplink data to be transmitted in step 403 and the uplink data (transport block) to be transmitted in step 405 are the same.

In a case that the NACK is received in step 406 of FIG. 4, the terminal apparatus 1 retransmits the PUSCH including the uplink data. In a case that the NACK is received in step 406 of FIG. 4, the terminal apparatus 1 retransmits the PUSCH not including the CSI even if the 'CSI request' field of the HOC grant is set to '1'. In the present embodiment, since the uplink data and the CSI are individually coded and HARQ is not applied to the CSI, the CSI does may not be retransmitted based on the reception of the NACK.

This enables the target base station apparatus 3A to quickly obtain the CSI for the target cell and efficiently perform the downlink scheduling.

Figure 6:
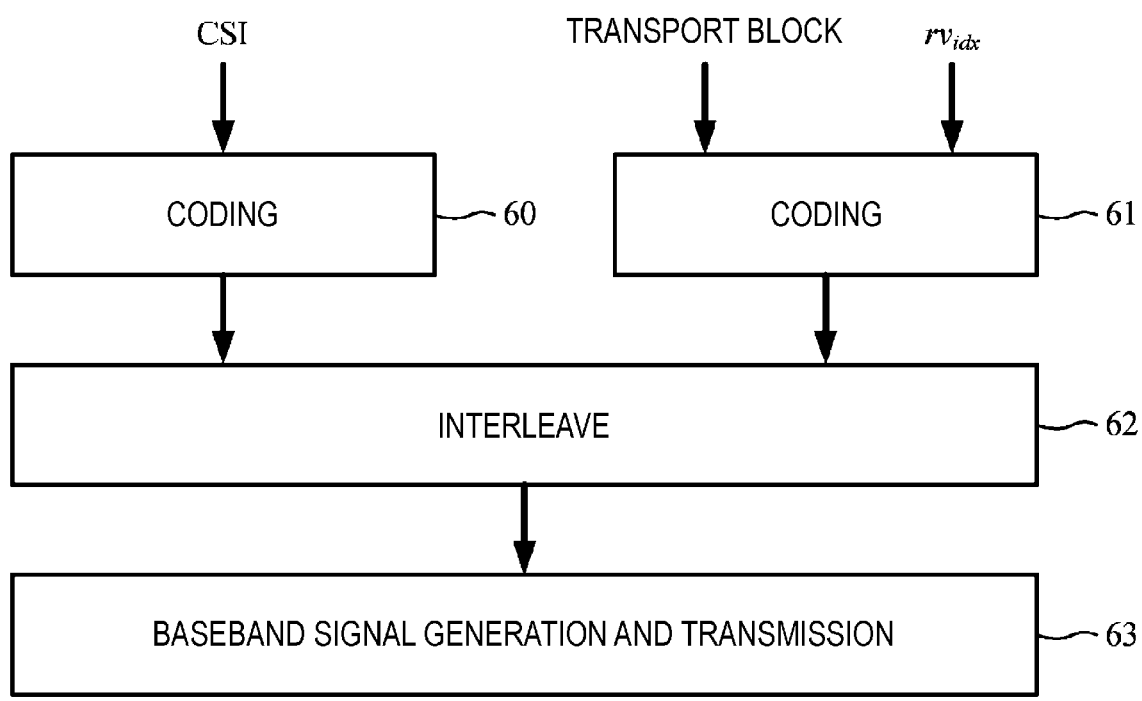
FIG. 6 is a diagram illustrating an example of coding processing of a transport block and CSI according to the present embodiment.

FIG. 6 is a diagram illustrating an example of coding processing of a transport block and CSI according to the present embodiment. In step 60, the CSI is coded. In step S61, the transport block is coded. Coding of the transport block is performed based on the redundant version $rv_{idx}$. In step S62, the coded bits of the CSI and the coded bits of the transport block are concatenated/interleaved. In step S63, the PUSCH signal is generated/transmitted.

Description of the coding of the transport block will follow.

Figure 7:
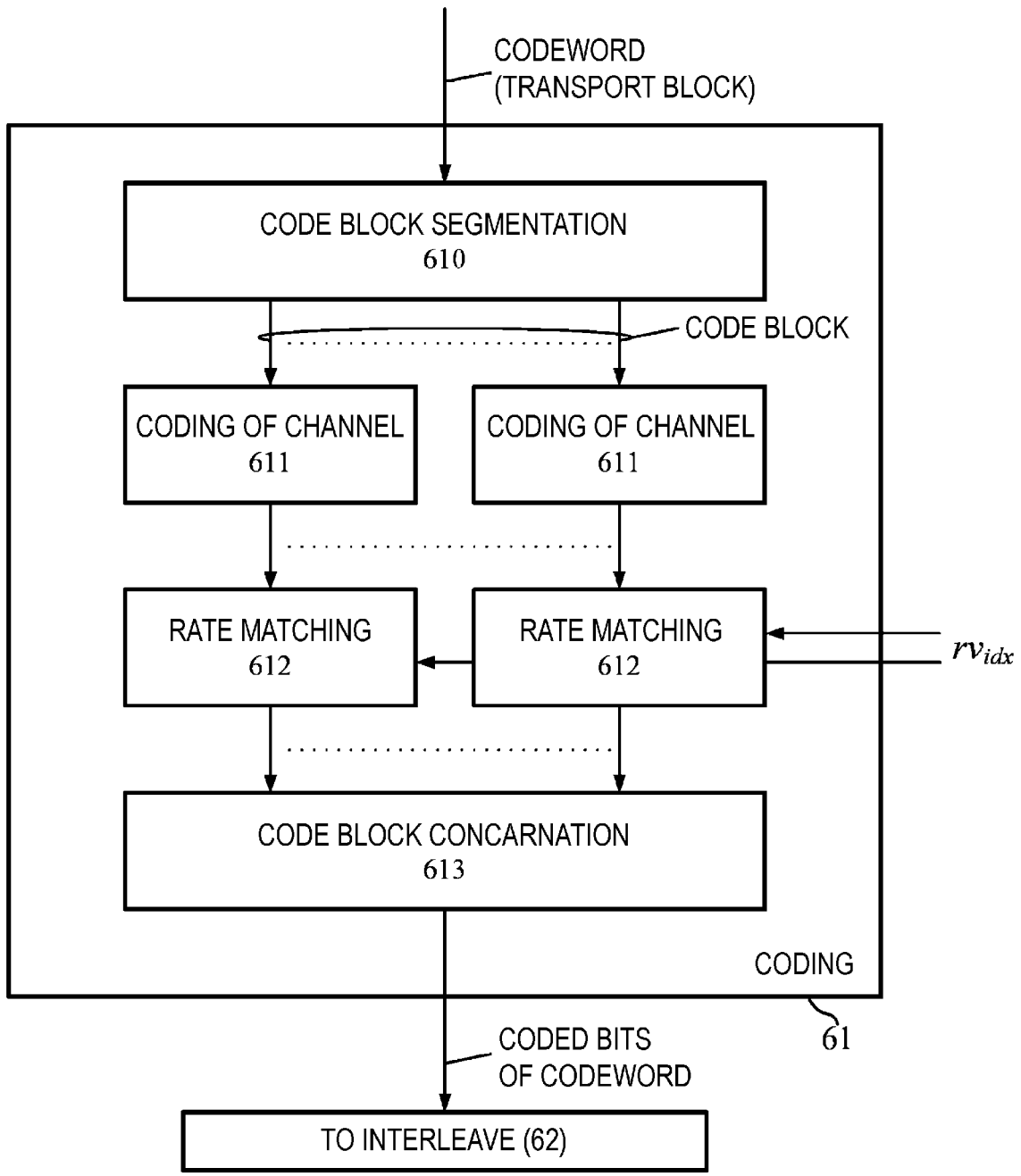
FIG. 7 is a diagram illustrating an example of a process of coding a codeword (transport block) according to the present embodiment.

FIG. 7 is a diagram illustrating an example of a process of coding a codeword (transport block) according to the present embodiment. The coding is performed in step 61 of FIG. 6. The process of FIG. 7 may be applied to each of the transport blocks. One transport block is mapped to one codeword. Namely, coding the transport block is identical to coding the codeword.

(Step 610) A corresponding CRC parity bit is added to one codeword, and then the codeword is divided into one or multiple code blocks. A corresponding CRC parity bit may be added to each of the code block. (Step 611) Each of the one or multiple code blocks is coded (turbo coded or convolutionally coded, for example).

(Step 612) Rate matching is applied to each of the sequence of coded bits of the code block. The rate matching is performed according to the redundancy version $rv_{idx}$.

(Step 613) A sequence of coded bits of the codeword is obtained by concatenating one or multiple code blocks to which rate matching is applied. The sequence of coded bits of the codeword is interleaved with the coded bits of the CSI in step 62 of FIG. 6.

Figure 8:
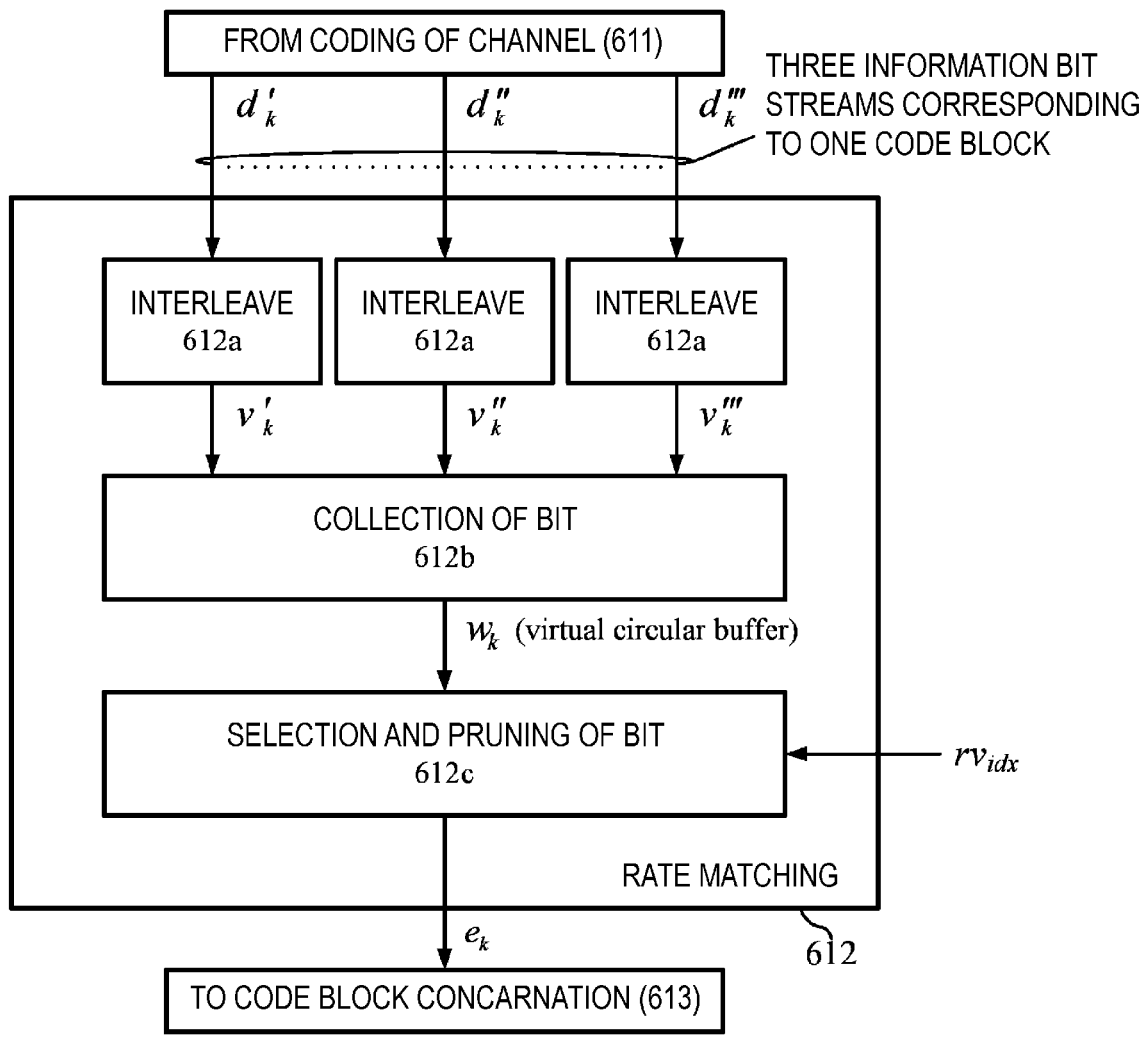
FIG. 8 is a diagram illustrating an example of a rate matching according to the present embodiment.

FIG. 8 is a diagram illustrating an example of a rate matching according to the present embodiment. The rate matching is performed in step 612 of FIG. 7. Namely, the rate matching is applied to the code block of the transport block.

One rate matching (step 612) includes three sub-steps of interleaving (step 612a), one sub-step of bit collection (step 612b), and one sub-step of bit selection and pruning (step 612c). Into one rate matching (step 612), three information bit streams ($d'_k$, $d''_k$, $d'''_k$) are input from the channel coding (step 611). In step 612a, each of the three information bit streams ($d'_k$, $d''_k$, $d'''_k$) is interleaved according to the sub-block interleaver. Three output sequences ($v'_k$, $v''_k$, $v'''_k$) are obtained by interleaving each of the three information bit streams ($d'_k$, $d''_k$, $d'''_k$).

The number $C_{subblock}$ of the columns of the subframe interleaver is 32. The number $R_{subblock}$ of the rows of the sub-block interleaver is the smallest integer that satisfies the following inequality (1), where D is the number of bits in each of the information bit streams ($d'_k$, $d''_k$, $d'''_k$).

$$D \leq (R_{subblock} \times C_{subblock}) \quad \text{[Expression 1]}$$

The number $K_{529}$ of bits in each of the output sequences ($v'k$, $v''k$, $v'''k$) of the subframe interleaver is given by Expression (2) below.

$$K_\Pi = (R_{subblock} \times C_{subblock}) \quad \text{[Expression 2]}$$

In step 612b, $w_k$ (virtual circular buffer) is obtained from the three output sequences ($v'_k$, $v''_k$, $v'''_k$). The virtual circular buffer $w_k$ is given by Expression (3) below, where the number Kw of bits of $w_k$ is three times $K_\Pi$.

$w_k = v'_k$ for $k=0, \ldots, K_\Pi-1$ $w_{K_\Pi+2k} = v''_k$ for $k=0, \ldots, K_\Pi-1$ $w_{K_\Pi+2k+1} = v'''_k$ for $k=0, \ldots, K_\Pi-1$ [Expression 3]

In step 612c, a rate matching output bit sequence $e_k$ is obtained from $w_k$. The number of bits of the rate matching output bit sequence $e_k$ is E. FIG. 9 is a diagram illustrating one example of bit selection and pruning according to the present embodiment. The parameter $rv_{idx}$ in FIG. 9 is an RV (redundancy version) number for transmission of the corresponding transport block. $N_{cb}$ in FIG. 9 is the soft buffer size for the corresponding code block and is expressed by the number of bits. $N_{cb}$ is given by Expression (4) below:

$$N_{cb} = \min\left(\left\lfloor \frac{N_{IR}}{C} \right\rfloor, K_w\right)$$ [Expression 4]

where C is the number of code blocks into which one transport block is divided in the code block segmentation (step 610) of FIG. 7, and $N_{IR}$ is the soft buffer size for the corresponding transport block and is represented by the number of bits. $N_{IR}$ is given by Expression (5) below:

$$N_{IR} = \left\lfloor \frac{N_{soft}}{K_C \cdot K_{MIMO} \cdot \min(M_{DL\_HARQ}, M_{limit})} \right\rfloor$$ [Expression 5]

where in a case that the terminal apparatus 1 is configured to receive the PDSCH transmission based on the transmission mode 3, 4, 8, 9, or 10, $K_{MIMO}$ is 2 and otherwise $K_{MIMO}$ 1. $K_{MIMO}$ is the same as the maximum number of transport blocks that one PDSCH transmission received based on the transmission mode in which the terminal apparatus 1 is configured can include.

Here, $M_{DL\_HARQ}$ is the maximum number of downlink HARQ processes managed concurrently in one corresponding serving cell. For the FDD serving cell, $M_{DL\_HARQ}$ may be 8. For the TDD serving cell, $M_{DL\_HARQ}$ may correspond to the uplink-downlink configuration. Here, $M_{limit}$ is 8.

Here, $K_c$ is any one of $\{1, 3/2, 2, 3, \text{and } 5\}$. A description of the method of configuring $K_c$ is omitted.

Here, $N_{soft}$ is the total number of soft channel bits corresponding to the UE category or the downlink UE category. $N_{soft}$ is given by any one of, the capability parameter ue-Category (without suffix), the capability parameter ue-Category-v1020, the capability parameter ue-Category-v1170, and the capability parameter ue-CategoryDL-r12.

A description of a method of acquiring the redundancy version $rv_{idx}$ used for coding the transport block will follow.

The terminal apparatus 1 determines the size of the transport block, modulation scheme $Q'_m$, and redundancy version $rv_{idx} \in \{0, 1, 2, 3\}$, for the PUSCH transmitted based on the detection of the PDCCH including the DCI format 0, based on the 'Modulation and coding scheme and redundancy version' field included in the DCI format 0.

The terminal apparatus 1 obtains the MCS index $I_{MCS}$ from the 'Modulation and coding scheme and redundancy version' field included in the DCI format 0. The terminal apparatus 1 obtains the modulation scheme $Q'_m$, the Transport Block Size (TBS) index $I_{TBS}$, and the redundancy version $rv_{idx}$ for the PUSCH transmitted based on the detection of the PDCCH including the DCI format 0, based on the MCS index $I_{MCS}$. The TBS index $I_{TBS}$ is used to determine the size of the transport block. The 'Modulation and coding scheme and redundancy version' field included in the DCI format 0 may have 5-bit length.

FIG. 10 is a diagram illustrating an example of a relationship among the MCS index $I_{MCS}$, the modulation scheme $Q'_m$, the transport block size (TBS) index $I_{TBS}$, and the redundancy version $rv_{idx}$, indicated by the 5-bit modulation and coding scheme and redundancy version' field according to the present embodiment. The MCS index $I_{MCS}$ $\{29, 30, 31\}$ may be used only in a case that the DCI format 0 indicates retransmission of the PUSCH (transport block). The MCS index $I_{MCS}$ indicated by the DCI format 0 may indicate the redundancy version $rv_{idx}$ $\{1, 2, 3\}$ only in a case that the DCI format 0 indicates retransmission of the PUSCH (transport block).

The terminal apparatus 1 determines the size of the transport block and the modulation scheme $Q'_m$ for the PUSCH to be initially transmitted based on the HOC command, based on the 'Modulation and coding scheme and redundancy version' field included in the HOC grant.

The terminal apparatus 1 obtains the MCS index $I_{MCS}$ from the 'Modulation and coding scheme and redundancy version' field included in the HOC grant. The terminal apparatus 1 obtains the modulation scheme $Q'_m$ and the TBS index $I_{TBS}$ for the PUSCH to be initially transmitted based on the HOC command, based on the MCS index $I_{MCS}$. The 'Modulation and coding scheme and redundancy version' field included in the HOC grant may have 5-bit length. The relationship in FIG. 8 may be applied to the HOC grant. In FIG. 8, the 5-bit 'Modulation and coding scheme and redundancy version' field included in the HOC grant may not indicate the MCS index $I_{MCS}$ $\{29, 30, 31\}$. Namely, the 5-bit 'Modulation and coding scheme and redundancy version' field included in the HOC grant may not indicate the redundancy version $rv_{idx}$ $\{1, 2, 3\}$.

The 'Modulation and coding scheme and redundancy version' field included in the HOC grant may have 4-bit length. FIG. 11 is a diagram illustrating an example of a relationship among the MCS index $I_{MCS}$, the modulation scheme $Q'_m$, the transport block size (TBS) index $I_{TBS}$, and the redundancy version $rv_{idx}$, indicated by the 4-bit 'Modulation and coding scheme and redundancy version' field according to the present embodiment. Each of the MCS indexes $I_{MCS}$ indicated by the HOC grant may correspond to the redundancy version $rv_{idx}$ of value 0.

FIG. 12 is a diagram illustrating an example of a case of retransmission according to the present embodiment.

(Case 1200) The terminal apparatus 1 detects the PDCCH for the PUSCH (transport block) after the terminal apparatus 1 newly transmits the transport block on the PUSCH. Here, the PDCCH includes the DCI format 0. Here, the HARQ feedback for the PUSCH (transport block) may or may not be detected. Here, the HARQ feedback is transmitted on the PHICH. In this case, the terminal apparatus 1 retransmits the PUSCH (transport block) according to the PDCCH ('New data indicator' field included in the DCI format 0). Here, the redundancy version $rv_{idx}$ used for retransmission of the PUSCH (transport block) is indicated by PDCCH ('Modulation and coding scheme and redundancy version' field included in DCI format 0).

(Case 1201) The terminal apparatus 1 detects the HARQ feedback for the PUSCH (transport block) after newly transmitting the transport block on the PUSCH. Here, the HARQ feedback is transmitted on the PHICH, and the HARQ feedback indicates the ACK. Here, the terminal apparatus 1 does not detect the PDCCH for the PUSCH (transport block). In this case, the terminal apparatus 1 does not retransmit the PUSCH (transport block). Here, the terminal apparatus 1 can resume the retransmission of the PUSCH (transport block) again according to the PDCCH. Here, the terminal apparatus 1 cannot resume the retransmission of the PUSCH (transport block) again according to the PHICH (NACK).

(Case 1202) The terminal apparatus 1 detects the HARQ feedback for the PUSCH (transport block) after newly transmitting the transport block on the PUSCH. Here, HARQ feedback is transmitted on the PHICH, and HARQ feedback indicates NACK. Here, the terminal apparatus 1 does not detect the PDCCH for the PUSCH (transport block). In this case, the terminal apparatus 1 retransmits the PUSCH (transport block). Here, the redundancy version $rv_{idx}$ used for the retransmission of the PUSCH (transport block) is given according to incremental redundancy. The redundancy version $rv_{idx}$ used for the retransmission of the PUSCH (transport block) is different from the redundancy version $rv_{idx}$ used for the transmission just before of the PUSCH (transport block).

(Case 1202) FIG. 13 is a diagram illustrating an example of a relationship between a state variable CURRENT_IRV and a redundancy version $rv_{idx}$ according to the present embodiment. The state variable CURRENT_IRV is an index in the sequence of the redundancy version $rv_{idx}$. The sequence of the redundancy version $rv_{idx}$ is 0, 2, 3, 1. The state variable CURRENT_IRV is updated using modulo 4. The MAC layer indicates, to the physical layer, a transmission of the PUSCH (transport block), and also increments the state variable CURRENT_IRV by one.

(Case 1203) In step 405 of FIG. 4, in a case that there is no response to the transport block transmitted using the PUSCH in step 403 in the predetermined period in step 404, the PUSCH (transport block) is retransmitted based on the HOC grant. Here, the redundancy version $rv_{idx}$ used for retransmission of the PUSCH (transport block) may be a fixed value (for example, '0'). Alternatively, the redundancy version $rv_{idx}$ used to retransmit the PUSCH (transport block) may be given by the subframe number of the subframe in which the PUSCH (transport block) is retransmitted.

A description of the subframe in which PUSCH is transmitted in steps 403 and 405 in FIG. 4 will follow.

The handover command may include subframe allocation information for indicating the subframe in which the PUSCH is transmitted in steps 403 and 405 of FIG. 4. The subframe pattern indicated by the subframe allocation information may be repeated for each predetermined unit.

In a case that the subframe pattern indicated by the subframe allocation information is repeated for each predetermined unit and the predetermined unit is 8 or 20, the terminal apparatus 1 cannot transmit the PUSCH in steps 403 and 405 of FIG. 4 in the uplink subframe indicated by the subframe allocation information, before acquiring the SFN based at least on the PBCH (MIB).

Therefore, it is preferable that the predetermined unit is a positive divisor of 10 and the pattern is started from the subframe with subframe number 0 in a radio frame in which SFN=0. The positive divisors of 10 are 1, 2, 5, 10. This enables the terminal apparatus 1 to transmit the PUSCH in steps 403 and 405 of FIG. 4 in the uplink subframe indicated by the subframe allocation information before acquiring the SFN based at least on the PBCH (MIB).

Figure 14:
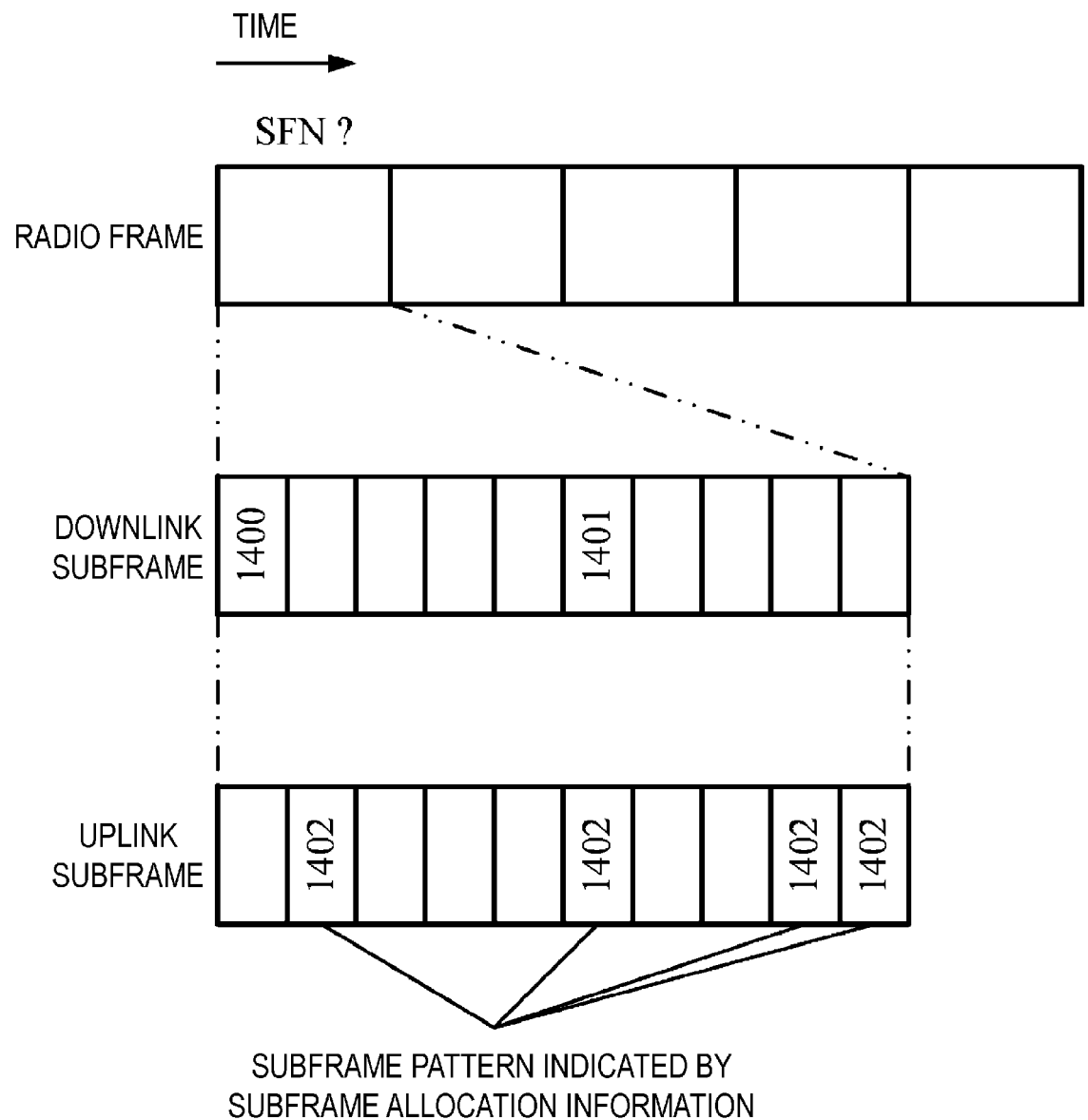
FIG. 14 is a diagram illustrating an example of a pattern of a subframe indicated by subframe allocation information according to the present embodiment.

FIG. 14 is a diagram illustrating an example of a pattern of a subframe indicated by subframe allocation information according to the present embodiment. In FIG. 14, the horizontal axis is a time axis. In FIG. 14, the pattern of the subframe indicated by the subframe allocation information starts from the subframe with subframe number 0 in the radio frame. In FIG. 14, the pattern of the subframe indicated by the subframe allocation information is repeated every ten subframes (one radio frame). Reference signs 1400 and 1401 are downlink subframes in which synchronization signals (PSS and SSS) are transmitted. The SSS transmitted in the downlink subframe 1400 is different from the SSS transmitted in the downlink subframe 1401. Reference sign 1402 denotes an uplink subframe indicated by the subframe allocation information.

The terminal apparatus 1 can recognize the boundary of the wireless frame by the PSS and the SSS. However, the terminal apparatus 1 cannot obtain the SFN from the PSS and the SSS. However, the terminal apparatus 1 can transmit the PUSCH in steps 403 and 405 of FIG. 4 in the uplink subframe 1402, before acquiring the SFN based at least on the PBCH (MIB).

This makes it possible to reduce handover delay.

A description on the configuration of an apparatus according to the present embodiment will follow.

Figure 15:
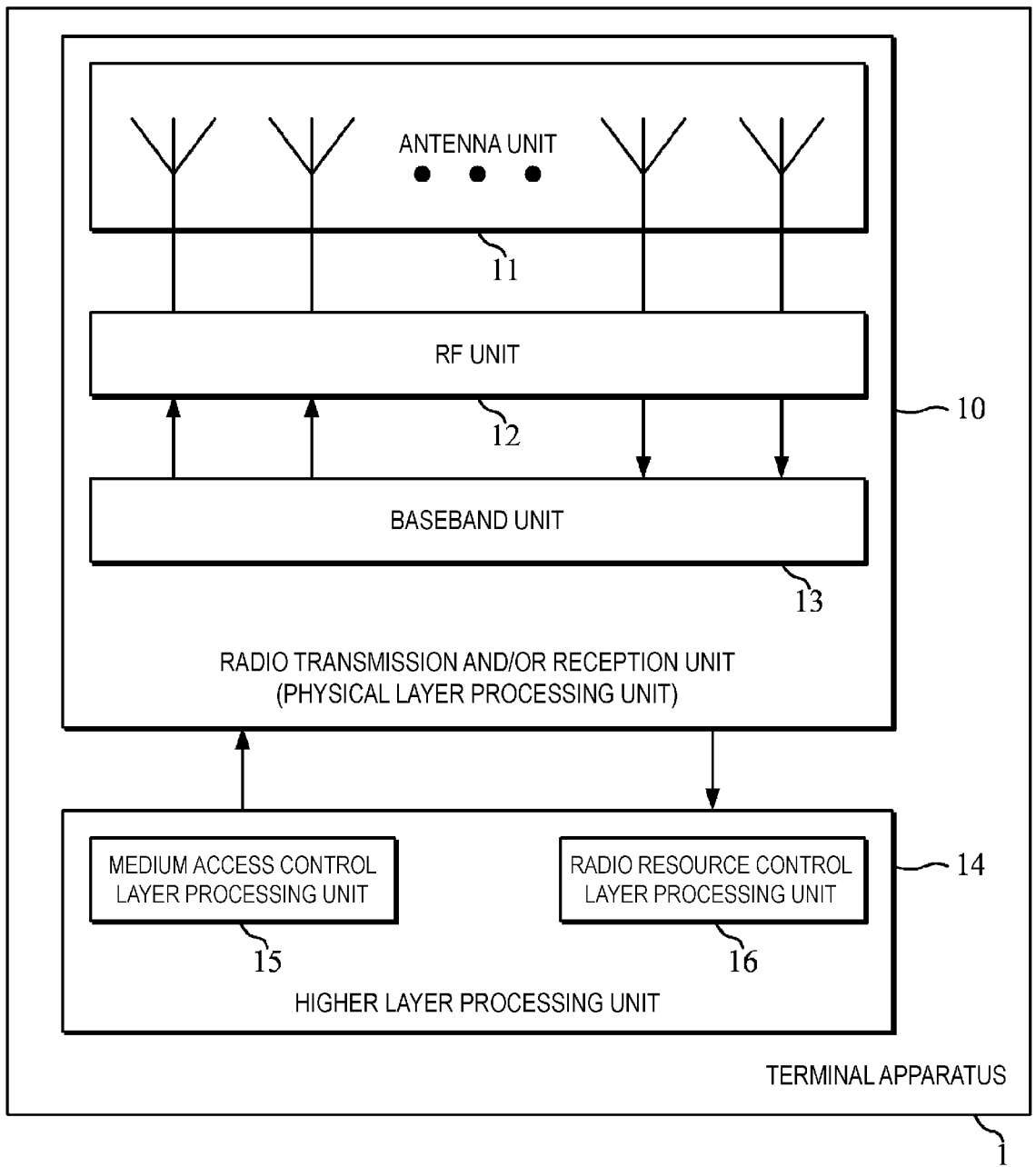
FIG. 15 is a schematic block diagram illustrating a configuration of a terminal apparatus 1 according to the present embodiment.

FIG. 15 is a schematic block diagram illustrating a configuration of the terminal apparatus 1 according to the present embodiment. As illustrated, the terminal apparatus 1 is configured to include a radio transmission and/or reception unit 10 and a higher layer processing unit 14. The radio transmission and/or reception unit 10 is configured to include an antenna unit 11, a Radio Frequency (RF) unit 12, and a baseband unit 13. The higher layer processing unit 14 is configured to include a medium access control layer processing unit 15 and a radio resource control layer processing unit 16. The radio transmission and/or reception unit 10 is also referred to as a transmitter, a receiver or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the Medium Access Control layer. The medium access control layer processing unit 15 controls transmission of a scheduling request, based on various types of configuration information/parameters managed by the radio resource control layer processing unit 16.

The radio resource control layer processing unit 16 included in the higher layer processing unit 14 performs processing of the Radio Resource Control layer. The radio resource control layer processing unit 16 manages the various types of configuration information/parameters of the terminal apparatus 1. The radio resource control layer processing unit 16 sets the various types of configuration information/parameters, based on higher layer signaling received from the base station apparatus 3. Namely, the radio resource control layer processing unit 16 sets the various types of configuration information/parameters, based on information indicating the various types of configuration information/parameters received from the base station apparatus 3.

The radio transmission and/or reception unit 10 performs processing of the physical layer, such as modulation, demodulation, coding, and decoding. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 modulates and codes data to generate a transmission signal, and transmits the transmission signal to the base station apparatus 3.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) on the signal from which the CP has been removed, and extracts a signal in the frequency domain.

The baseband unit 13 performs Inverse Fast Fourier Transform (IFFT) on data, generates an SC-FDMA symbol, attaches a CP to the generated SC-FDMA symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted analog signal via the antenna unit 11. Furthermore, the RF unit 12 amplifies power. Furthermore, the RF unit 12 may have a function of controlling transmit power. The RF unit 12 is also referred to as a transmission power control unit.

Figure 16:
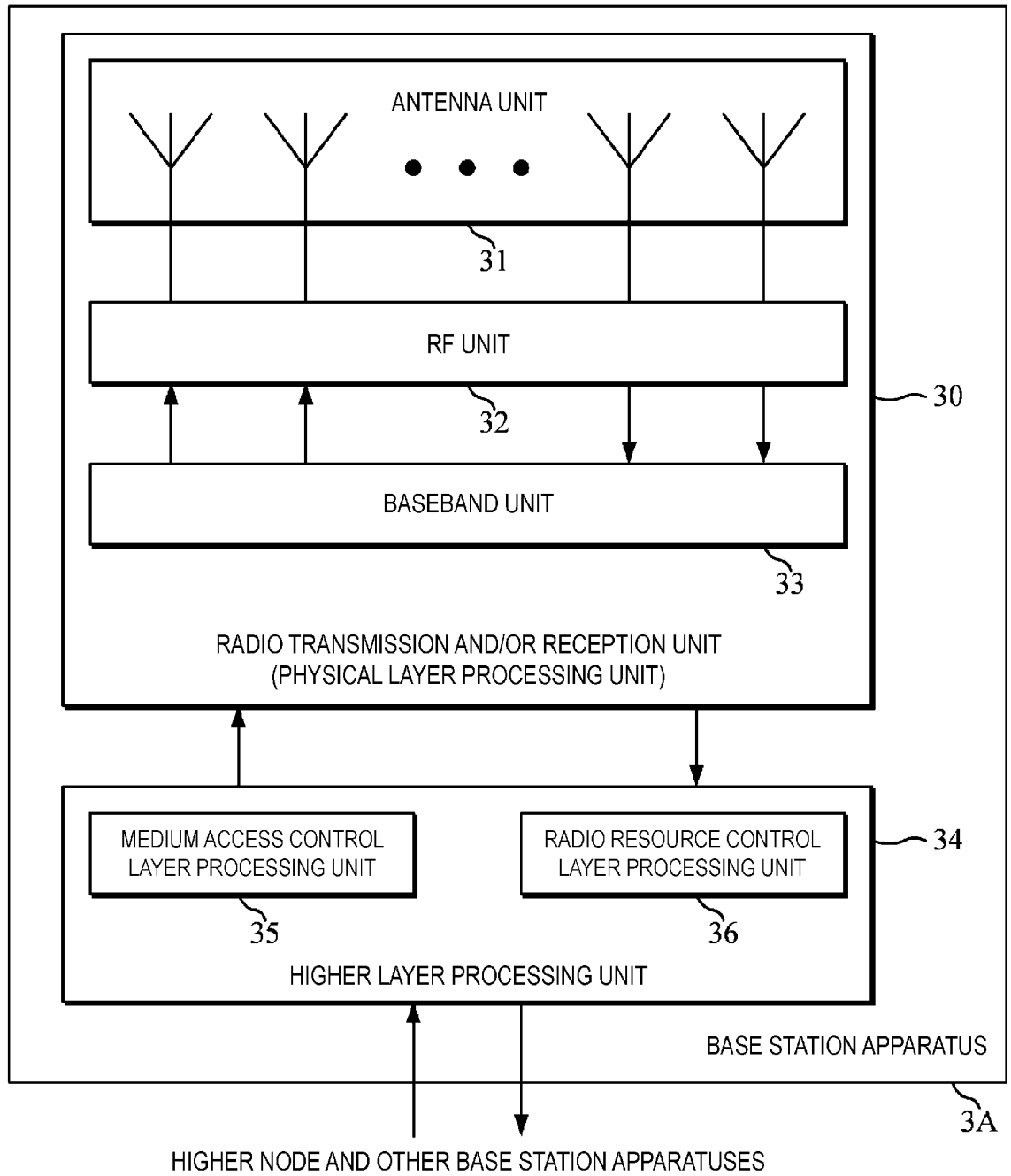
FIG. 16 is a schematic block diagram illustrating a configuration of a target base station apparatus 3B according to the present embodiment.

FIG. 16 is a schematic block diagram illustrating a configuration of a target base station apparatus 3B according to the present embodiment. As illustrated, the target base station apparatus 3B is configured to include a radio transmission and/or reception unit 30 and a higher layer processing unit 34. The radio transmission and/or reception unit 30 is configured to include an antenna unit 31, an RF unit 32, and a baseband unit 33. The higher layer processing unit 34 is configured to include a medium access control layer processing unit 35 and a radio resource control layer processing unit 36. The radio transmission and/or reception unit 30 is also referred to as a transmitter, a receiver or a physical layer processing unit. The configuration of the source base station apparatus 3A may be the same as the configuration of the target base station apparatus 3B.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the Medium Access Control layer. The medium access control layer processing unit 35 performs processing associated with a scheduling request, based on various types of configuration information/parameters managed by the radio resource control layer processing unit 36. The upper layer processing unit 34 may transmit information to another base station apparatus and the MME/GW3C. The upper layer processing unit 34 may receive information from another base station apparatus and the MME/GW3C.

The radio resource control layer processing unit 36 included in the higher layer processing unit 34 performs processing of the Radio Resource Control layer. The radio resource control layer processing unit 36 generates, or obtains from a higher node, downlink data (transport block) allocated on a physical downlink shared channel, system information, an RRC message, a MAC Control Element (CE), and the like, and outputs the generated or obtained data to the radio transmission and/or reception unit 30. Furthermore, the radio resource control layer processing unit 36 manages various types of configuration information/parameters for each of the terminal apparatus 1. The radio resource control layer processing unit 36 may set various types of configuration information/parameters for each of the terminal apparatus 1 via the higher layer signaling. Namely, the radio resource control layer processing unit 36 transmits/broadcasts information indicating various types of configuration information/parameters.

The functionality of the radio transmission and/or reception unit 30 is similar to that of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit.

Various aspects of the terminal apparatus 1 and the base station apparatus 3 according to the present embodiment will be described below.

(1) According to a first aspect of the present embodiment, a terminal apparatus supporting a handover from a source cell (a source base station apparatus) to a target cell (a target base station apparatus) includes a receiver 10 for receiving, in the source cell, a handover command (a parameter RRC-ConnectionReconfiguration including a parameter mobility-ControlInfo) including a CSI (Channel state information) request and an uplink grant (a HOC grant), and a transmitter 10 for performing, when the CSI request is set to trigger an aperiodic CSI report, a first transmission of uplink data including the CSI for the target cell, based on the uplink grant.

(2) In the first aspect of the present embodiment, the uplink data includes a complete message (RRCConnection-ReconfigurationComplete message), and the complete message is transmitted to confirm the handover.

(3) In the first aspect of the present embodiment, the transmitter 10 performs a second transmission of the uplink data including the CSI for the target cell, based on the absence of a response to the first transmission. Here, the response to the first transmission may be some or all of the response types A to D described above.

(4) In the first aspect of the present embodiment, the transmitter 10 performs a third transmission of the uplink data not including the CSI for the target cell, based on the detection of Negative Acknowledgment (NACK) for the first transmission.

(5) In the first aspect of the present embodiment, the coding of the uplink data is performed based on the redundancy version $rv_{idx}$, and the redundancy version applied to the uplink data of the second transmission is the same as the redundancy version applied to the uplink data of the first transmission.

(6) In the first aspect of the present embodiment, the redundancy version applied to the uplink data of the third transmission is different from the redundancy version applied to the uplink data of the first transmission.

(6) According to a second aspect of the present embodiment, a target base station apparatus that communicates with a terminal apparatus supporting a handed over from a source base station apparatus to a target base station apparatus includes, a higher layer processing unit 34 that transmits a handover command to the source base station apparatus, the handover command (Parameter RRCConnectionReconfiguration including parameter mobilityControlInfo) transferred by the source base station apparatus to the terminal apparatus, and the handover command including a CSI (Channel state Information) request and an uplink grant (HOC grant), and a receiver 30 that receives a first transmission of the uplink data including the CSI for the target cell of the target base station apparatus based on the uplink grant, if the CSI request is set to trigger an aperiodic CSI report.

(7) In the second aspect of the present embodiment, the uplink data includes a complete message (RRCConnectionReconfigurationComplete message), and the complete message is transmitted to confirm the handover.

This thereby enables the terminal apparatus and the base station apparatus to efficiently communicate with each other.

The base station apparatus 3 according to the present invention can also be realized as an aggregate (an apparatus group) configured of multiple apparatus. Each of the apparatus constituting such an apparatus group may include some or all of each function or each functional block of the base station apparatus 3 according to the above-described embodiment. It suffices that a series of functions or functional blocks of the base station apparatus 3 are possessed by the apparatus group. In addition, the terminal apparatus 1 according to the above-described embodiment can also communicate with the base station apparatus as the aggregate.

Furthermore, the base station apparatus 3 according to the above-described embodiment may be an Evolved Universal Terrestrial Radio Access Network (EUTRAN). Furthermore, the base station apparatus 3 according to the above-described embodiment may have some or all of the higher-node functions than an eNodeB.

A program running on an apparatus according to one embodiment of the present invention may be a program that controls a Central Processing Unit (CPU) and the like to realize the functions of the above-described embodiment according to one aspect of the present invention. A program or information handled by the program are temporarily read into a volatile memory such as a Random Access Memory (RAM) while being processed, or stored in a non-volatile memory such as a flash memory or a Hard Disk Drive (HDD), and then read by the CPU as necessary to be modified or written.

The apparatus in the above-described embodiment may be partially enabled by a computer. In such a case, such control functions may be realized by recording a program to realize the control functions on a computer-readable recording medium and causing a computer system to read the program recorded on the recording medium and to execute the same. The "computer system" referred to herein is a computer system built into the apparatus, and the computer system is assumed to include an operating system and hardware components such as peripheral devices. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a network like the Internet or communication line when transmitting the program over a communication channel such as a telephone line, and may also include a medium that retains a program for a fixed period of time such as a volatile memory within the server or the computer system to serve as a client in such a case. Furthermore, the above-described program may be a program that realizes some of the functions described above, and additionally may be a program to realize the functions described above in combination with a program already recorded in the computer system.

Furthermore, each functional block or various features of the apparatus used in the above-described embodiment may be implemented or performed by an electric circuit, namely, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, a discrete gate or transistor logic, a discrete hardware component, or a combination thereof. The general-purpose processor may be a microprocessor, or alternatively, the processor may be a processor, a controller, a microcontroller, or a state machine of known type. The general-purpose processor or each of the above-mentioned circuits may be configured of a digital circuit or may be configured of an analog circuit. Furthermore, should an integrated circuit technology emerge that replaces the present integrated circuit, it is also possible to use an integrated circuit based on that technology.

Note that the invention of the present patent application is not limited to the above-described embodiments. In the embodiment, apparatus have been described as an example, but the invention of the present application is not limited thereto. It is applicable to a terminal apparatus or a communication apparatus for an electronic equipment of a stationary-type or a non-movable type installed indoors or outdoors such as an audio-visual equipment, a kitchen equipment, a cleaning or washing machine, an air-conditioning equipment, office equipment, a vending machine, and other household equipment.

The embodiments of the present invention have been described above in detail referring to the drawings, but the specific configuration is not limited to the embodiments and includes, for example, an amendment to a design that falls within the scope that does not depart from the gist of the present invention. Furthermore, it is possible to make various modifications to the aspects of the present invention within the scope of the claims. An embodiment obtained by appropriately combining technical elements each disclosed in different embodiments falls also within the technical scope of the present invention. Furthermore, a configuration in which the elements described in each of the above embodiments and have the same effect are used substituting one another is also included.

CROSS-REFERENCE TO RELATED APPLICATION

This application claims the benefit of priority to JP 2016-053474 filed on Mar. 17, 2016, which is incorporated herein by reference in its entirety.

REFERENCE SIGNS LIST 1 (1A, 1B, 1C) Terminal apparatus
3 Base station apparatus
10 Radio transmission and/or reception unit 11 Antenna unit
12 RF unit
13 Baseband unit
14 Higher layer processing unit
15 Medium access control layer processing unit
16 Radio resource control layer processing unit
30 Radio transmission and/or reception unit
31 Antenna unit
32 RF unit
33 Baseband unit
34 Higher layer processing unit
35 Medium access control layer processing unit
36 Radio resource control layer processing unit

The invention claimed is:

1. A terminal apparatus to be handed over from a source cell to a target cell, the terminal apparatus comprising:
a receiver configured to receive a higher layer information mobilityControlInfo including a first uplink grant and a subframe allocation information different from the first uplink grant, the subframe allocation information indicating a set of one or more subframes that is of a plurality of subframes included in each radio frame, and the set of one or more subframes being equally allocated in every radio frame; and
a transmitter configured to perform a transmission of a first data based on the first uplink grant in one subframe of the set of one or more subframes, wherein
the transmitter is configured to retransmit the first data based on a first redundancy version, the first redundancy version being set to 0 in a case that a first physical downlink control channel for the first data is not received, and the first redundancy version for retransmission is a fixed value of 0 based on that an uplink grant used for retransmission is the first uplink grant, and
the receiver receives a second physical downlink control channel including a second uplink grant different from the first uplink grant, the transmitter is configured to perform a transmission of a second data based on the second uplink grant, and the transmitter retransmits the second data based on a second redundancy version corresponding to a variable updated each time the second data is retransmitted based on the second uplink grant, in a case that a third physical downlink control channel for the second data is not received.

2. A base station apparatus configured to communicate with a terminal apparatus supporting a handover from a source cell to a target cell, the base station apparatus comprising:
a transmitter configured to transmit a higher layer information mobilityControlInfo including a first uplink grant and a subframe allocation information different from the first uplink grant, the subframe allocation information indicating a set of one or more subframes that is of a plurality of subframes included in each radio frame, and the set of one or more subframes being equally allocated in every radio frame; and
a receiver configured to receive a transmission of a first data transmitted by the terminal apparatus based on the first uplink grant in one subframe of the set of one or more subframes, wherein
the receiver receives the first data based on a first redundancy version, the first redundancy version being set to 0 in a case that a first physical downlink control channel for the first data is not received by the terminal apparatus, and the first redundancy version for retransmission is a fixed value of 0 based on that an uplink grant used for retransmission is the first uplink grant, and
the transmitter transmits a second physical downlink control channel including a second uplink grant different from the first uplink grant, the receiver performs a reception of a second data based on the second uplink grant, and the receiver receives the second data based on a second redundancy version corresponding to a variable updated each time the second data is retransmitted based on the second uplink grant, in a case that a third physical downlink control channel for the second data is not received by the terminal apparatus.

3. A communication method for a terminal apparatus to be handed over from a source cell to a target cell, the communication method comprising:
receiving a higher layer information mobilityControlInfo including a first uplink grant and a subframe allocation information different from the first uplink grant, the subframe allocation information indicating a set of one or more subframes that is of a plurality of subframes included in each radio frame, and the set of one or more subframes being equally allocated in every radio frame; and
performing a transmission of a first data based on the first uplink grant in one subframe of the set of one or more subframes, wherein
retransmitting the first data based on a first redundancy version, the first redundancy version being set to 0 in a case that a first physical downlink control channel for the first data is not received, and the first redundancy version for retransmission is a fixed value of 0 based on that an uplink grant used for retransmission is the first uplink grant, and
receiving a second physical downlink control channel including a second uplink grant different from the first uplink grant, performing a transmission of a second data based on the second uplink grant, and retransmitting the second data based on a second redundancy version corresponding to a variable updated each time the second data is retransmitted based on the second uplink grant, in a case that a third physical downlink control channel for the second data is not received.

4. A communication method for a base station apparatus to communicate with a terminal apparatus supporting a handover from a source cell to a target cell, the communication method comprising:
transmitting a higher layer information mobilityControlInfo including a first uplink grant and a subframe allocation information different from the first uplink grant, the subframe allocation information indicating a set of one or more subframes that is of a plurality of subframes included in each radio frame, and the set of one or more subframes being equally allocated in every radio frame; and
receiving a transmission of a first data transmitted by the terminal apparatus based on the first uplink grant in one subframe of the set of one or more subframes, wherein
receiving the first data based on a first redundancy version, the first redundancy version being set to 0 in a case that a first physical downlink control channel for the first data is not received by the terminal apparatus, and the first redundancy version for retransmission is a fixed value of 0 based on that an uplink grant used for retransmission is the first uplink grant, and
transmitting a second physical downlink control channel including a second uplink grant different from the first uplink grant, performing a reception of a second data based on the second uplink grant, and receiving the second data based on a second redundancy version corresponding to a variable updated each time the second data is retransmitted based on the second uplink grant, in a case that a third physical downlink control channel for the second data is not received by the terminal apparatus.

\* \* \* \* \*